United States Patent
Huang et al.

(10) Patent No.: US 9,604,312 B2
(45) Date of Patent: Mar. 28, 2017

(54) FAST-SPEED LASER SCORING METHOD

(75) Inventors: Wangya Huang, Shanghai (CN); Guobao Li, Shanghai (CN); Xinqiang Zhang, Shanghai (CN); Xing Mao, Shanghai (CN); Wanqing Guo, Shanghai (CN); Jianru Zhu, Shanghai (CN); Banglin Xiang, Shanghai (CN)

(73) Assignee: BAOSHAN IRON & STEEL CO., LTD. (CN)

( * ) Notice: Subject to any disclaimer, the term of this patent is extended or adjusted under 35 U.S.C. 154(b) by 906 days.

(21) Appl. No.: 13/876,932

(22) PCT Filed: Apr. 28, 2011

(86) PCT No.: PCT/CN2011/073417
§ 371 (c)(1),
(2), (4) Date: Jun. 25, 2013

(87) PCT Pub. No.: WO2012/068829
PCT Pub. Date: May 31, 2012

(65) Prior Publication Data
US 2013/0284711 A1    Oct. 31, 2013

(30) Foreign Application Priority Data
Nov. 26, 2010  (CN) .......................... 2010 1 0562021

(51) Int. Cl.
*B23K 26/00*  (2014.01)
*B23K 26/36*  (2014.01)
(Continued)

(52) U.S. Cl.
CPC .......... *B23K 26/365* (2013.01); *B23K 26/362* (2013.01); *C21D 8/12* (2013.01);
(Continued)

(58) Field of Classification Search
CPC ...... B23K 26/362; B23K 26/365; C21D 1/38; C21D 2201/05; C21D 8/12; C21D 8/1294
(Continued)

(56) References Cited

U.S. PATENT DOCUMENTS 4,500,771 A * 2/1985 Miller ................ B23K 26/0846
148/111
7,442,260 B2   10/2008 Sakai et al.

FOREIGN PATENT DOCUMENTS

| CN | 1216072 A | 5/1999 |
| CN | 1761764 A | 4/2006 |

(Continued)

OTHER PUBLICATIONS

International Search Report dated Sep. 8, 2011, in International Application No. PCT/CN2011/073417; International Filing Date: Apr. 28, 2011; Applicant: Baoshan Iron & Steel Co., Ltd.
(Continued)

*Primary Examiner* — Quang D Thanh
*Assistant Examiner* — Joseph Iskra
(74) *Attorney, Agent, or Firm* — Hovey Williams LLP

(57) ABSTRACT

A fast-speed laser scoring method is provided, in which a set of related laser scoring device is used to simultaneously score lines on the upper surface and the lower surface of an oriented silicon steel strip, which is being fed and traveling forwards on a production line, with high-focalized continuous wave laser beam; the lines scored on the upper surface and the lines scored on the lower surface have the same space between every two adjacent scored lines but are staggered each other in order to reduce iron loss evenly. The space between every two adjacent scored lines on the same surface is 6-12 mm, laser power is 1000-3000 W and scanning speed is 100-400 m/min. The machining rate of the scoring method and device attains 1.5-2 times the one of
(Continued)

conventional scoring methods which can not simultaneously score the upper and lower surfaces of a steel strip at a time. The lines scored on a steel strip by the method can reduce iron loss of the strip by 10-16%.

1 Claim, 2 Drawing Sheets

(51) Int. Cl.
  *C21D 8/12* (2006.01)
  *B23K 26/362* (2014.01)
  *C21D 1/38* (2006.01)
(52) U.S. Cl.
  CPC ............. *C21D 8/1294* (2013.01); *C21D 1/38* (2013.01); *C21D 2201/05* (2013.01)
(58) Field of Classification Search
  USPC ........ 219/50, 121.6, 121.67, 121.68, 121.69, 219/121.72; 148/110, 111
  See application file for complete search history.

(56) References Cited

FOREIGN PATENT DOCUMENTS

| CN | 101209514 | * | 7/2008 |
| CN | 101348853 | * | 1/2009 |
| EP | 0992591 | A2 | 4/2000 |
| JP | 2000-109961 | A | 4/2000 |
| JP | 2002-121618 | A | 4/2002 |
| JP | 2002121618 | * | 4/2002 |
| KR | 1006368520000 | | 10/2006 |
| KR | 1010517460000 | | 7/2011 |
| WO | 2008/050700 | A1 | 5/2008 |
| WO | 2009/082155 | A1 | 7/2009 |

OTHER PUBLICATIONS

Guojian; Zhao et al.; Study on Reducing Iron Loss and Improving Time-Effect of the High Permeability Oriented Silicon Steel; Date: 1994;Shanghai Library—Institute of Scientific & Technical Information of Shanghai.

Office Action dated May 7, 2014 and letter reporting same, in Russian Patent Application No. 2013114290; Applicant: Baoshan Iron & Steel Co., Ltd.

Office Action dated Mar. 27, 2014 and summarized translation thereof, in Korean Patent Application No. 10-2013-7007968; Applicant: Baoshan Iron & Steel Co., Ltd.

Second Office Action dated Jul. 25, 2014 and summarized translation thereof, in Korean Patent Application No. 10-2013-7007968; Applicant: Baoshan Iron & Steel Co., Ltd.

Office Action dated Apr. 15, 2014 and foreign associate's comments on action, in Japanese Patent Application No. 2013-530536; Applicant: Baoshan Iron & Steel Co., Ltd.

* cited by examiner

FAST-SPEED LASER SCORING METHOD

FIELD OF THE INVENTION

This invention relates generally to a laser scoring method, and particularly, to a fast-speed laser scoring method. By this laser scoring method, it is possible to simultaneously score lines on both the upper surface and the lower surface of a steel strip so as to raise machining rate of a laser scoring machine and to raise the contribution of the scored lines to reduce iron loss of the steel strip.

BACKGROUND OF THE INVENTION

Oriented silicon steel sheets are essential material for manufacturing various transformers. A transformer consumes electric power because of its iron loss. For this reason, to reduce iron loss is an ever-seeking target in production of oriented silicon steel sheets. Iron loss of silicon steel sheets is divided into hysteresis loss and eddy current loss. The eddy current loss is subdivided into classical eddy current loss (caused by eddy current) and abnormal eddy current loss (caused by magnetic domain wall movement and proportional to width of magnetic domain). Under the condition of power frequency, abnormal eddy current loss amounts is nearly to half of iron loss. With the development of metallurgic technology, metallographic texture (110) [001] has been constantly getting to perfect, it will certainly cause crystal grains to grow up too quickly during secondary re-crystallization and to become big grains, this will cause magnetic domain width to enlarge and the proportion of abnormal eddy current loss to increase. In this case, it gets more and more difficult to continuously use conventional metallurgic process to further reduce iron loss.

In order to further reduce iron loss of oriented silicon steel sheets by fining magnetic domain, many steelworks and steel research institutes in the world have carried on research on technology for fining magnetic domain and have successively developed various surface treatment technologies, such as machining method, laser irradiating method, discharge treatment method, plasma jet irradiation method, local heating method, ultrasonic vibration method, fluid jetting method, and so on. These methods can fine magnetic domain by fining the space between 180° magnetic domain walls, so as to attain the goal of reducing iron loss. Among them, the laser scoring method is the most prominent.

By reducing major magnetic domain width of oriented silicon steel, the laser irradiating method reduces eddy current loss of the sheet. In more detail, by using heat of laser beam, this method enables silicon steel sheet to generate an elastic-plastic deformed area beneath its surfaces and reduces major magnetic domain width of oriented silicon steel by pressure stress generated in the elastic-plastic deformed area and tension stress between the scored lines, so as to attain the goal to reduce eddy current loss. Being able to reduce iron loss greatly and being a kind of non-contact machining, this method has very high reliability and controllability.

There have been many patents which relate to the method to reduce iron loss of oriented silicon steel by laser scoring. The Chinese patent CN1216072A disclosed a grain-oriented electric steel sheet with excellent magnetic property and its production process and equipment. In this process, pulse laser irradiating is used to decrease the space between 180° magnetic domain walls and so to improve magnetic property. This process uses Q-switch $CO_2$ laser to irradiate the surface of grain-oriented electric steel sheet with irradiating power density adjusted to be not above a threshold which will damage the insulation film on surfaces of the steel sheet, by using an oval facula whose major axis is in transverse direction of the steel sheet to irradiate the surface of the steel sheet and by making the oval facula partially overlap so as to generate a continuous laser beam and to provide sufficient accumulated irradiation energy necessary for improving magnetic property. Thereby, the problem that conventional pulse laser irradiation technique trends to damage the insulation film on steel sheet surfaces is solved rather successfully. In that process, however, scanning speed can not be too fast in order to ensure sufficient accumulated energy, which restricts scoring rate of a laser scoring machine and can not meet requirements for high-speed laser scoring.

The Chinese patent CN1761764A disclosed a sort of oriented electromagnetic steel sheet with good magnetic property and its manufacture process. In that process, scanning irradiation by continuously oscillating optical fiber laser beam with wave length λ of $1.07 \le \lambda \le 2.10$ μm is carried on to reduce iron loss of oriented silicon steel. However, to use continuously oscillating optical fiber laser beam with wave length λ of $1.07 \le \lambda \le 2.10$ μm leads to a rather high beam intensity nearby the center, which is likely to give rise to unsmoothness of the surface to have been irradiated. If it is intended to solve this problem by reducing mean output power P of the laser device, it is necessary to reduce scanning speed simultaneously, which will certainly impair machining rate of the laser device.

The Chinese patent CN 101209514 disclosed an on-line laser high-speed scoring device based on an array of vibrating mirrors. The device includes support frame, carrying belt, vibrating mirror array, laser array and controls for controlling the vibrating mirror array and laser array. Because of incorporating the vibrating mirror array, this method is able to efficiently raise laser scoring speed and has advantages such as flexible adaptability, high scoring speed, wide scanning breadth, high production efficiency, but regrettably, that method can not simultaneously conduct scoring on both surfaces of a steel strip. In comparison to other laser scoring methods, this method is not superior.

The Chinese patent CN1076492A disclosed a laser treatment process and its device for reducing iron loss of silicon steel sheet. By using the characteristics of laser to heat and cool both quickly, the process makes score-formed treatment on oriented silicon steel sheet and promotes heated area to generate minor plastic deformation and high-density dislocation so as to form sub-boundary of grains and thus to decrease wall length of major magnetic domain, meanwhile to cause residual tension stress so as to attain the goal of fining magnetic domain and reducing iron loss. The process is feasible and the device is simple. However, in that process, iron loss can be reduced by only about 5% and machining rate is not taken into account.

Moreover, the Chinese patent CN101348853 disclosed a process of reducing iron loss of common orientated electric steel. In that process, surface coating film of silicon steel sheet will be destroyed badly and need to be re-applied after being scored. In addition, inconvenient operation and high production cost has had this process to have been out of use. The Chinese patent CN1244597A disclosed a process of treating surface of heat-resistance oriented electric steel sheet by a laser. By making local areas of silicon steel sheet alloyed, this process is able to optimize magnetic domain distribution and so to reduce iron loss, thereby to make electric steel sheet to have stability in high temperature and excellent aging property. However, in that process, it is necessary to strip off the insulation coating film of silicon steel sheet prior to implementing the process, and the silicon steel sheet needs to be re-applied with a insulation coating film after being scored. The process is too complicated to implement and not applicable for mass production.

SUMMARY OF THE INVENTION

The object of the invention is to provide a fast-speed laser scoring method, the scoring method is able to simultaneously score lines on both the upper surface and the lower surface of an oriented silicon steel strip, its machining rate can attain 1.5-2 times the one of conventional scoring methods which can not simultaneously score the upper and lower surfaces of a steel strip. The lines scored on a steel strip by the method can reduce iron loss of the steel strip by 10-16%.

In order to attain the above object, the technological solution of the scoring method is to use high-focalized continuous wave laser beam to simultaneously score lines on both the upper and lower surfaces of a steel strip which is being fed and traveling forwards on a production line; the lines scored on the upper surface and the lines scored on the lower surface have the same space between every two adjacent scored lines but are staggered with respect to each other in order to reduce iron loss evenly. The space between every two adjacent scored lines on the same surface is 6-12 mm, laser power is 1000-3000 W, scanning speed is 100-400 m/min.

Under both a constant laser power and a scanning speed, the area influenced by stress generated by scored lines is constant too. And the fineness of magnetic domain of oriented silicon steel sheet is proportional to stress magnitude. Hence, as the space between every two adjacent scored lines is reduced, the width of major magnetic domain of oriented silicon steel sheet is got fined and iron loss of it drops down. However, when the width of major magnetic domain is less than a certain dimension (0.2 mm or so), hysteresis iron loss will rise up steeply so as to increase the whole iron loss of the silicon steel sheet. For example, a relation between iron loss and magnetic domain width of grade B23R090 silicon steel sheet is shown in FIG. 2. For this reason, in order to attain a good result of reducing iron loss, it is necessary to select a proper space between every two adjacent scored lines.

Moreover, under a constant scanning speed, the biggest machining rate of a scoring machine is proportional to the space of every two adjacent scored lines. The wider the space is, the higher the allowable biggest machining rate is. Considering both the contribution of the scored lines and the machining rate of the scoring machine, in the scoring method of the invention, the space between every two adjacent scored lines is selected to be 6-12 mm.

The benefits of the invention are at least as follows:

1. By superposing closed magnetic domain of the upper and lower surfaces of silicon steel sheet, it is possible to further fine magnetic domain and so to attain the goal to reduce iron loss by scored lines.

2. The scoring method of the invention is able to simultaneously score lines on both the upper surface and the lower surface of an oriented silicon steel strip with the biggest space between every two adjacent scored lines being up to 12 mm, and able to easily reduce iron loss by 10%. Contrarily, conventional scoring methods can only score lines on one surface of a silicon steel sheet at a time and its widest space between every two adjacent scored lines can not be beyond 6 mm in order to reduce iron loss by 10%. That is to say, to get the same result of reducing iron loss, the scoring speed of the invention's method is 1.5-2 times that of conventional scoring methods. Therefore, the scoring method and scoring machine of the invention can score lines at a machining rate which is over two times that of conventional scoring methods, and, therefore, it is applicable for rapid mass production.

3. As the scoring method of the invention is able to simultaneously score lines on both the upper surface and the lower surface of an oriented silicon steel strip and the stress caused by scoring on the upper surface and the lower surface of the oriented silicon steel strip has an effect to further fine magnetic domain, the scoring method is able to reduce iron loss of a silicon steel strip consistently by 10-16%, even by so high as up to 16%, while conventional scoring methods can reduce the one by at most only 13%. Obviously, the former is superior to the latter.

DETAILED DESCRIPTION OF THE INVENTION

The invention is now described in detail in reference to the accompanying drawings and the embodiments.

Figure 1:
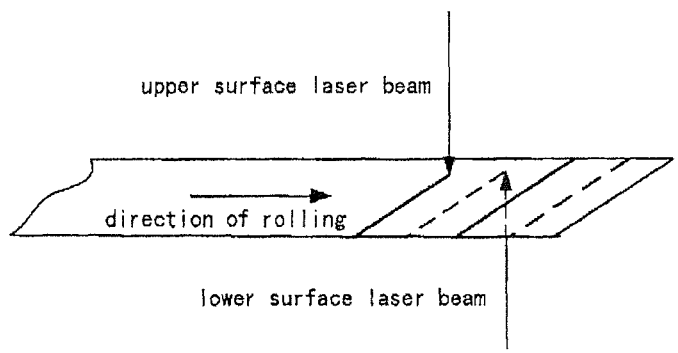
FIG. 1 is a schematic diagram of optical path of laser irradiation according to the invention.

Referring to FIG. 1, the fast-speed laser scoring method employs a laser scoring device and is able to simultaneously score lines on both the upper and lower surfaces of an oriented silicon steel strip which is being fed and traveling forwards on a production line with high-focalized continuous wave laser beam. The lines scored on the upper surface and the lines scored on the lower surface have the same space between every two adjacent scored lines but are staggered with respect to each other in order to reduce iron loss evenly. The space between every two adjacent scored lines on the same surface is 6-12 mm, laser power is 1000-3000 W, and scanning speed is 100-400 m/min.

Let's take it for example to describe that to use $CO_2$ gas continuous wave laser with 10.6 μm wave length and double laser projectors to make scoring simultaneously on each side of the strip steel. The related data are given in Table 1.

TABLE 1

| No. | steel sheet thickness mm | laser power W | scanning speed m/min | scanning breadth mm | scanning space mm | scoring machine highest speed m/min | P17/50, W/kg before scoring | P17/50, W/kg after scoring | iron loss reduction % |
|---|---|---|---|---|---|---|---|---|---|
| embodiment 1 | 0.23 | 2000 | 250 | 1200 | 6 | 102 | 0.88 | 0.75 | 14.77 |
| embodiment 2 | 0.23 | | | | 7 | 120 | 0.89 | 0.74 | 16.85 |
| embodiment 3 | 0.23 | | | | 8 | 138 | 0.89 | 0.75 | 15.73 |
| embodiment 4 | 0.23 | | | | 9 | 156 | 0.87 | 0.74 | 14.94 |
| embodiment 5 | 0.23 | | | | 10 | 174 | 0.87 | 0.75 | 13.79 |
| embodiment 6 | 0.23 | | | | 11 | 192 | 0.89 | 0.77 | 13.48 |
| embodiment 7 | 0.23 | 1000 | 150 | 1200 | 10 | 112 | 0.88 | 0.75 | 14.77 |
| embodiment 8 | 0.23 | 1500 | 200 | | | 140 | 0.87 | 0.75 | 13.79 |
| embodiment 9 | 0.23 | 2500 | 300 | | | 200 | 0.89 | 0.76 | 14.61 |
| embodiment 10 | 0.23 | 3000 | 350 | | | 220 | 0.88 | 0.76 | 13.64 |
| comparative object 1 | 0.23 | 2000 | 250 | 1200 | 3 | 48 | 0.91 | 0.81 | 10.99 |
| comparative object 2 | 0.23 | | | | 4 | 66 | 0.89 | 0.78 | 12.36 |
| comparative object 3 | 0.23 | | | | 5 | 84 | 0.89 | 0.78 | 12.36 |
| comparative object 4 | 0.23 | | | | 6 | 102 | 0.90 | 0.81 | 10.00 |
| comparative object 5 | 0.23 | | | | 7 | 120 | 0.87 | 0.80 | 8.05 |
| comparative object 6 | 0.23 | 1000 | 150 | 1200 | 5 | 56 | 0.87 | 0.78 | 10.34 |
| comparative object 7 | 0.23 | 1500 | 200 | | | 70 | 0.89 | 0.80 | 10.11 |
| comparative object 8 | 0.23 | 2500 | 300 | | | 100 | 0.88 | 0.78 | 11.36 |
| comparative object 9 | 0.23 | 3000 | 350 | | | 110 | 0.88 | 0.80 | 9.09 |

Figure 2:
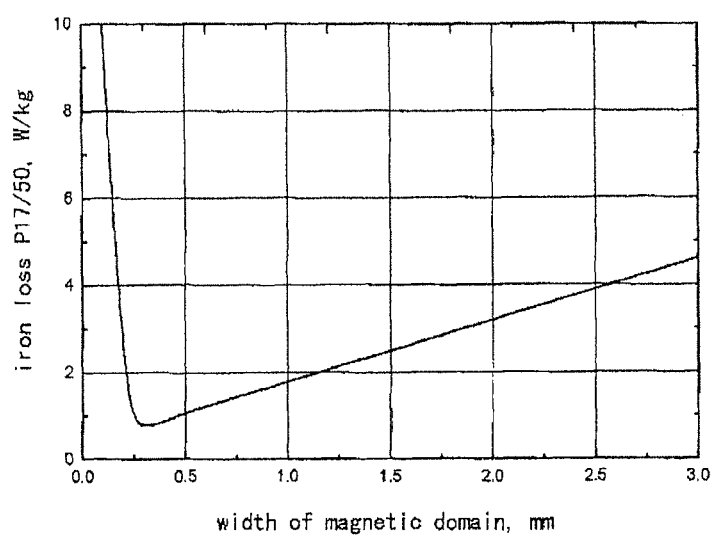
FIG. 2 shows an interrelation between iron loss of oriented silicon steel sheet and width of magnetic domain (silicon steel sheet product of grade R090 with 0.23 mm thickness)

As can be seen in FIG. 2, as the width of magnetic domain is decreased, iron loss drops down gradually. But when the width is less than a certain dimension (0.2 mm or so), iron loss rises up steeply.

Figure 3:
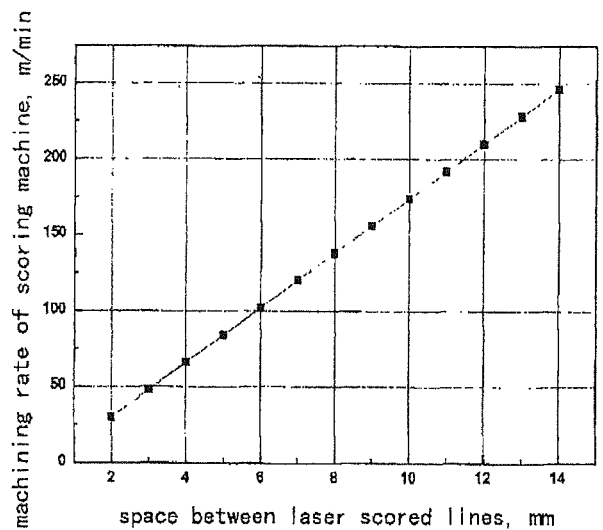
FIG. 3 shows an interrelation between machining rate of a laser scoring machine and space of the scored lines (continuous laser source, double laser head, machining rate of the laser scoring machine at scanning speed of 250 m/min)

As can be seen in FIG. 3, there is a proportional relation between the highest machining rate of the scoring machine and the space between every two adjacent scored lines, the wider the space is, the higher the highest machining rate of the scoring machine is allowed to be.

Figure 4:
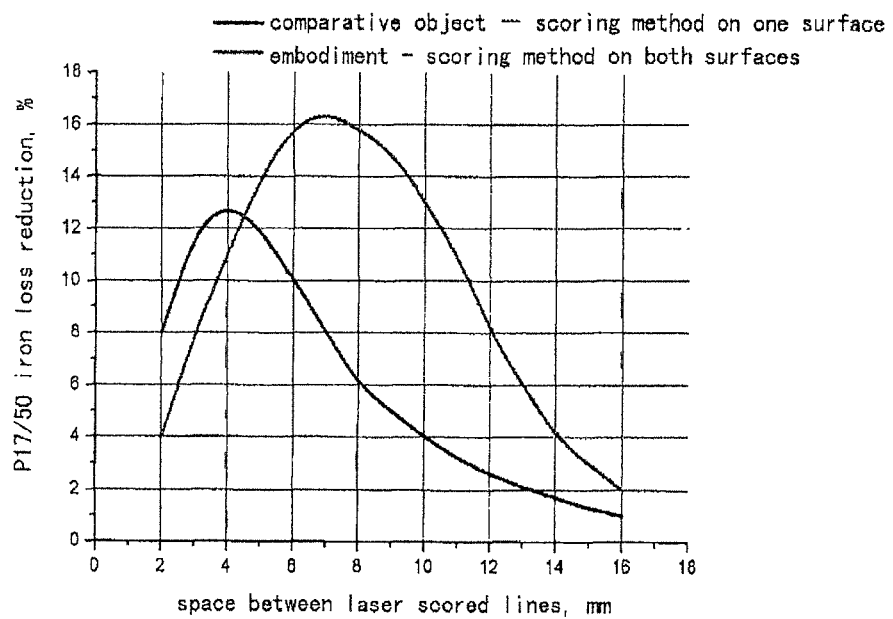
FIG. 4 shows the embodiments of the invention, i.e., the relationships between the space of every two adjacent scored lines and the percent of iron loss reduction of silicon steel sheet of 0.23 mm NSGO in both the embodiments and the comparative objects ($CO_2$ gas continuous wave laser with 10.6 μm wave length, 0.2×8 mm facula diameter, 2000 W laser power, 250 m/min scanning speed).

Relationships between the space of every two adjacent scored lines and the percent of iron loss reduction in both the embodiments and the comparative objects are shown in FIG. 4. As can be seen in Table 1 and FIG. 4, under the conditions that all the laser source, steel sheet thickness, laser power, scanning speed, scanning breadth are the same, in comparison to scoring on one surface of the steel sheet, scoring simultaneously on the upper surface and the lower surface of the steel sheet can have a wider interline space, a higher machining rate of the scoring machine, and can attain a greater iron loss reduction percent.

To sum up the above, the scoring method of the invention is capable of scoring lines simultaneously on both upper surface and lower surface of a steel strip, and so is superior to the scoring methods of the prior arts in scoring speed and scoring efficiency.

The invention claimed is:

1. A fast-speed laser scoring method comprising:
   moving an oriented silicon steel strip in a forward direction on a production line; and
   operating a laser scoring device at a constant power of 1000-3000 W to simultaneously create score lines on both an upper surface and a lower surface of the moving oriented silicon steel strip at a constant scanning speed of 100-400 m/min using focalized continuous wave laser beams moving in a direction transverse to said forward direction,
   wherein the score lines on the upper surface and on the lower surface have a same spacing of 6-12 mm between every adjacent ones of the score lines,
   wherein the score lines on the upper surface are staggered with respect to the score lines on the lower surface.

* * * * *